United States Patent [19]

Berg et al.

[11] Patent Number: 4,980,426

[45] Date of Patent: Dec. 25, 1990

[54] MOLDING COMPOUNDS OF POLYCARBONATE MIXTURES HAVING A HIGH DISPERSE SOLUBILITY

[75] Inventors: Klaus Berg, Krefeld; Güther Weymans, Leverkusen; Ulrich Grigo, Kempen; Ludwig Bottenbruch, Krefeld, all of Fed. Rep. of Germany

[73] Assignee: Bayer Aktiengesellschaft, Bayerwerk, Fed. Rep. of Germany

[21] Appl. No.: 419,063

[22] Filed: Oct. 10, 1989

[30] Foreign Application Priority Data

Oct. 15, 1988 [DE] Fed. Rep. of Germany ....... 3835203

[51] Int. Cl.$^5$ ............................................. C08L 69/00
[52] U.S. Cl. ..................................... 525/462; 525/469
[58] Field of Search ............................... 525/462, 469

[56] References Cited

U.S. PATENT DOCUMENTS

| | | | |
|---|---|---|---|
| 3,166,606 | 1/1965 | Reinking et al. | 260/860 |
| 3,334,154 | 8/1967 | Kim | 260/860 |
| 3,809,676 | 5/1974 | Liberti | 260/45.75 |
| 3,855,277 | 12/1974 | Fox | 260/45.7 |
| 3,890,266 | 6/1975 | Serini et al. | 260/37 |
| 4,081,495 | 3/1978 | Freitag et al. | 260/860 |
| 4,140,730 | 2/1979 | Binsack et al. | 260/860 |
| 4,155,949 | 5/1979 | Kamiyama et al. | 260/857 |
| 4,186,154 | 1/1980 | Binsack et al. | 525/461 |
| 4,373,065 | 2/1983 | Prest, Jr. | 525/132 |
| 4,678,845 | 7/1987 | Takamatsu et al. | 525/462 |

FOREIGN PATENT DOCUMENTS

| | | |
|---|---|---|
| 49-115146 | 2/1974 | Japan . |
| 49-034549 | 3/1974 | Japan . |
| 49-053942 | 5/1974 | Japan . |
| 60-004550 | 1/1985 | Japan . |
| 60-008356 | 1/1985 | Japan . |
| 61-019656 | 1/1986 | Japan . |
| 61-078864 | 4/1986 | Japan . |
| 2010160 | 1/1987 | Japan . |
| 1568531 | 5/1980 | United Kingdom . |

*Primary Examiner*—Lewis T. Jacobs
*Assistant Examiner*—David Buttner
*Attorney, Agent, or Firm*—Joseph C. Gil; Aron Preis

[57] ABSTRACT

This invention relates to halogen-free binary mixtures of two fully aromatic polycarbonates each having a disperse solubility of from 18 to 35 $(J/ccm)^{\frac{1}{2}}$, in which both polycarbonates are of high molecular weight and each contains not more than 70 mol-% of bisphenol A. The invention further relates to the use of these mixtures for optical data stores and to molded parts produced from the mixtures.

9 Claims, No Drawings

MOLDING COMPOUNDS OF POLYCARBONATE MIXTURES HAVING A HIGH DISPERSE SOLUBILITY

This invention relates to halogen-free binary mixtures of two fully aromatic polycarbonates each having a disperse solubility of from 18 to 35 $(J/ccm)^{\frac{1}{2}}$, in which both polycarbonates are of high molecular weight and each contains not more than 70 mol-% of bisphenol A.

The mixtures according to the invention are suitable for use as substrates for optical data stores by virtue of their low double refraction since such mixtures may be used for the production of moulded articles which have an exceptionally low double refraction in the tangential and the radial direction to the surface of the plate.

This invention thus also relates to the use of these mixtures for optical data stores and to the moulded parts prepared from the mixtures.

Binary mixtures prepared from various fully aromatic polycarbonates are known from the literature.

US-PS 3 855 277, for example, records flame resistant mixtures of a halogen-containing low molecular weight polycarbonate with an optionally structurally modified polycarbonate. Halogen-free polycarbonate mixtures are not described in the said document.

Mixtures of two fully aromatic polycarbonates characterised by outstanding flame resistance are known from US-PS 3 890 266. One of the components of the mixture is either pure bisphenol-A-polycarbonate or a halogen-containing co-condensate.

Polycarbonate mixtures having a halogen content of more than 5% by weight and characterised by good flame resistance are known from US-PS 4 140 730.

Mixtures of known polycarbonates with oligomeric polycarbonates containing certain end groups are known from US-PS 4 081 495. The oligomeric polycarbonates have a weight average molecular weight of from 1200 to 9000 g/mol.

Halogen-free polycarbonate mixtures in which at least one of the components contains at least 80 mol-% of bisphenol A are known from US-PS 4 186 154. These mixtures have good processing properties.

Polycarbonate mixtures with improved pressure sensitivity are described in US-PS 3 166 606. The resins described there are composed of from 10% to 90% by weight of a high molecular weight polycarbonate which has a reduced viscosity of more than 0.6% and from 90% to 10% by weight of a low molecular weight polycarbonate which has a reduced viscosity of at most 0.5. The said document particularly mentions mixtures containing bisphenol-A-polycarbonate and copolyesters but gives no indication of the optical properties of the mixtures.

Flame resistant polycarbonate mixtures containing from 30% to 1% by weight of a polycarbonate containing tetrabromo-bisphenol-A are disclosed in US-PS 3 334 154.

Glass fibre reinforced polycarbonate mixtures containing halogen-bis-phenol-ethylene are disclosed in DOS 2 709 389. These polycarbonate mixtures are said to be flame resistant and to have a high Izod notched impact strength.

JA 49-034 549 describes flame-resistant polycarbonate mixtures in which one component is bisphenol-A-polycarbonate and the second component is a halogen-containing poly-carbonate and a fatty acid salt of a metal from the second group of the Periodic System is added to the mixture.

Polycarbonate mixtures of a halogen-containing and a halogen-free polycarbonate are disclosed in DOS 2 602 179. These polycarbonate mixtures have good flow properties and are flame-resistant.

Polycarbonate mixtures of bisphenol-A-polycarbonate and 1,1-bis-(4-hydroxyphenyl)-cyclohexane polycarbonate suitable for blow moulding are disclosed in JA 49-053 942.

Resin compositions containing a polyester in addition to a bisphenol-A-polycarbonate and 1,1-bis-(4-hydroxyphenyl)-cyclohexane-polycarbonate are described in JA 49-115 146. These resin compositions are impermeable to water vapour.

Polycarbonate mixtures composed of a known polycarbonate such as, for example, bisphenol-A-polycarbonate, glass balls, flakes or fibres and 2 to 15 recurrent units of a special oligomeric polycarbonate are disclosed in JA 60-004 550. Moulded products obtained from these mixtures are said to have surfaces to which inks and dyes adhere firmly.

Mixtures of bisphenol-A-polycarbonate with 1,1-bis-(4-hydroxyphenyl)-1-phenylethane disclosed in JA-60 008 356 are said to have mechanical properties which are superior to those of the individual polycarbonates.

Polycarbonate mixtures containing halogen-containing polycarbonates disclosed in US-PS 3 809 676 are flame-resistant and colour stable in the heat.

The use of the mixtures for optical purposes has been described in the Patent Specifications mentioned above.

Polycarbonate mixtures composed of (a) polycarbonates prepared from conventional diphenols and (b) polycarbonate resins prepared from conventional diphenols containing certain long chained alkyl end groups are described in JA 61-078 864. The molecular weights of the resin compositions are from 13,000 to 20,000 g/mol. The blends are said to have excellent fluidity in the molten state and are therefore suitable for the production of optical moulded parts such as digital discs, video discs and data storage discs. Their disadvantages lie in the discolourations of the mixtures and in their inferior mechanical properties which are due to their low molecular weight.

The basic materials for optical instruments are required to meet a combination of numerous demands. For example, they are not only required to have excellent transparency, heat resistance, moisture resistance and mechanical strength but also to have excellent optical properties. There is therefore a high demand for resins which satisfy these requirements.

The information on optical data stores is read by means of the linear polarised light of a laser and is also inscribed with such light in the case of a data store which is inscribable. The magneto-optical data stores constitute one of the systems for inscribable and erasable processes. For these processes, it is particularly important to use a substrate material which is free from double refraction since even a slight rotation (by less than 1 degree) of the plane of light extinction is read as a signal.

The double refraction of synthetic resins (thermoplasts) is composed mainly of two factors: A material specific component and a component resulting from the processing operation, also known as orientation double refraction. Thermoplastic moulded parts which have a low double refraction may therefore be obtained by two different measures, i.e. either by suitable choice of the processing parameters, e.g. by processing low viscosity types at relatively high temperatures, as for example when audio compact discs are produced by injection moulding or injection stamping thermoplastic polycarbonates, or by using a material which by its nature has only a low tendency to double refraction, such as polymethyl acrylates, which are used for the production of video discs.

Inscribable storage processes such as magneto optical systems require a relatively high energy level for the inscription if acceptable signal/noise ratios are to be obtained. An optical system with a large numerical aperture is used for this purpose. Due to the aperture angle of the inscribing and reading optical system, it is also important to obtain the least possible anisotropy for the path of the beam in the tangential and the radial direction. Thus compact discs which already have very low path differences of double refraction (less than 10 nm/mm) in the axial direction still have high values in the tangential and radial direction, typically amounting to from 500 to 1000 nm/mm.

General methods of procedure for lowering the double refraction of moulding compounds are given in the dissertation by B. Hahn, TH Darmstadt, 1983, pages 35 et seq. According to the information given there, the double refraction may be reduced by using a combination of a material which has a positive optical anisotropy such as PVDF with a material which has a negative optical double refraction such as PMMA in the form of a compatible polymer mixture, i.e. a mixture which is homogeneous on the molecular plane. Mixtures of polycarbonates having a disperse solubility of from 18 to 35 $(J/ccm)^{\frac{1}{2}}$ are not described in the said dissertation. Further, the processing properties of PVDF/PMMA mixtures is not satisfactory.

According to the teaching given in US-PS 4 373 065, molecular compensation of the double refraction may be obtained by mixing completely miscible polymers which have opposite double refractions. Mixtures of polyphenylene oxide and polystyrene are given as specific examples. One disadvantage of these systems, however, is their discolouration. Further, polycarbonate mixtures having a disperse solubility of from 18 to 35 $(J/ccm)^{\frac{1}{2}}$ are not mentioned in the said document.

Polymer mixtures which have approximately the same refractive indices, e.g. polycarbonate/SMA, which are transparent because the refractive indices are approximately identical, are disclosed in JA 84/141 138. These systems are relatively incompatible and have the serious disadvantage that the reduction in double refraction is not uniform along a moulded part. These systems therefore do not meet the technical requirements of optical data stores.

According to the process described in Janeschitz-Kriegl, Polymer Melt Rheology and Flow Birefringence, Springer Verlag 1983, the double refraction is characterised by orientating a polymer melt by shearing in a cone-plate rheometer. During the rotation, the double refraction is read by a laser beam through the gap of the plate, i.e. in the radial direction. A shear stress is produced by the shear velocity D and the melt viscosity $\eta$. This shear stress produces double refraction. The value for the double refraction is obtained from the equation $$\Delta n = \frac{2c}{\sin 2X} \cdot \eta \cdot D$$

where X is the angle of extinction. This angle may be directly measured by means of the measuring arrangement of a polarisation microscope. The function $\Delta n(D)$ is first determined isothermally for various temperatures T. The melt viscosity $\eta$ at the same temperature is then calculated from dynamic-mechanical measurements using the Cox-Merz rule. This result is used for calculating the optical constant C, which gives similar values for different values of D and T and is therefore a constant which characterises the double refraction of the moulding compound. Mixtures having a very small optical constant C have the desired optical properties.

The solubility of polymers depends on three magnitudes, namely the solubility which describes the interaction with polar groups, the solubility which takes into account the hydrogen bridge bonding and the disperse solubility which defines the contributions made by disperse forces. The solubility parameters of polymers cannot be directly measured but since the solubility parameters of very many low molecular weight materials are known, the parameters of polar solubility, hydrogen bridge bonding solubility and disperse solubility of the polymers may be determined by the processes described e.g. by C.M. Hansen in Journal of Paint Technology, Vol. 39, (1967), pages 104 et seq. When determining the solubility parameters, only this three-dimensional dependence of the solubility (polar, disperse and hydrogen bridge bonding) should be taken into account for characterising the solubilities. The quantitative values for solubility characterisation may also be calculated by the incremental method described by Van Krevelen in "Properties of Polymers", Elsevier Scientific Publishing Company Amsterdam, 1976, pages 141 et seq. Where the said reference mentions the increments for calculating the three components of the solubility parameter (taking into account the data of Table VII, page 590, and formula (4.5), page 64), the solubility values are values obtained solely by this incremental method; in other cases, the values are determined experimentally by the above mentioned Hansen process.

The subject matter of the present invention is in our opinion neither anticipated nor suggested by the cited state of the art.

It has now been shown that halogen-free binary high molecular weight polycarbonate mixtures which have a low bisphenol-A content and a disperse solubility of from 18 to 35 $(J/ccm)^{178}$ have excellent optical properties and may therefore be used e.g. as substrates for optical data stores.

The present invention thus relates to halogen-free binary mixtures of two fully aromatic polycarbonates each having a relative viscosity (determined in methylene chloride at a polymer concentration of c=5 g/l at T =25°C.) above 1.16, preferably above 1.2, and each having a molar bisphenol A content based on the bisphenol content of the individual polycarbonate, of not more than 70 mol-%, preferably not more than 30 mol-%, characterised in that the disperse solubility of each polycarbonate is from 18 to 35 $(J/ccm)^{\frac{1}{2}}$ preferably from 18 to 26 $(J/ccm)^{\frac{1}{2}}$, most preferably from 18.5 to 22 $(J/ccm)^{\frac{1}{2}}$. The disperse solubility of one of the components may be from 18.5 to 23 $(J/ccm)$ while that of the other component is from 18 to 35 $(J/ccm)^{\frac{1}{2}}$.

Examples of polycarbonates suitable as components of the mixture of polycarbonates according to the invention include polycarbonates having an average molecular weight Mw of more than 20,000 g/mol, provided the relative viscosity is greater than 1.16. The mixtures may be composed of the two aromatic polycarbonates of high disperse solubility in any proportions. For example, from 5% to 95% by weight of one polycarbonate having a glass transition temperature below 150°C. may be mixed with 95% to 5% by weight of a polycarbonate having a glass transition temperature above 150°C. Mixtures in which the relative viscosities of the two polycarbonate components differ by not more than 0.4 are particularly suitable but it may also be advantageous to use one component of aromatic polycarbonate having a relative viscosity of from 1.16 to 1.3 while the other component has a relative viscosity of from 1.25 to 2.8.

The polycarbonates according to the invention may be homopolycarbonates based on conventional divalent p-p'-linked phenols or any cocondensates based on mixtures of these phenols, provided the disperse solubility (measured by the incremental method or by the Hansen process if the increments are not known) is from 18 to 35 (J/ccm)$^{\frac{1}{2}}$ and each of the polycarbonates contains not more than 70 mol-% of bisphenol-A. These cocondensates may be randomly structured cocondensates or block cocondensates. Branched polycarbonates may also be used if the molar content of branching agents, based on the bisphenol content, is not greater than 3 mol-%.

Such polycarbonates contain in particular bisphenols corresponding to the following general formula (I)

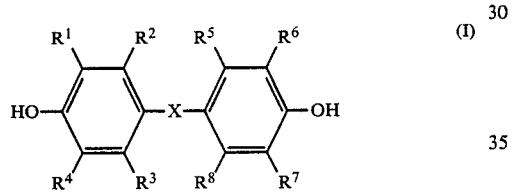

wherein $R^1$ to $R^8$ are independent of one another and may be identical or different and each contains from 0 to 40 carbon atoms, from 0 to 5 S, O or N atoms or denotes H and the disperse solubility of the compound is from 18 to 35 (J/ccm)$^{\frac{1}{2}}$. The divalent group X contains from 0 to 5 S, O or N atoms, from 0 to 40 carbon atoms or in particular denotes $SO_2$, O, S or CO. Divalent groups X corresponding to the following general formula (II) in which at least one of the groups $R^9$ or $R^{10}$ contain at least one optionally substituted aryl compound are preferred:

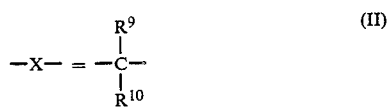

The bisphenols mentioned above are suitable for the preparation of the polycarbonates used for the mixtures according to the invention if the disperse solubility of these polycarbonates is from 18 to 35 (J/ccm)$^{\frac{1}{2}}$.

The bisphenols as such are well known to the man of the art and have been described, for example, in U.S. No. 3 028 365, U.S. No. 2 999 835, U.S. No. 3 148 172, U.S. No. 2 991 273, U.S. No. 3 271 367, U.S. No. 2 999 846, DOS No. 1 570 703, DOS No. 2 063 050 and DOS No. 2 063 052.

The mixtures according to the invention may be prepared, for example, by compounding in the process of extrusion: working up of the mixtures to produce moulded articles or data stores may be carried out, for example by injection moulding.

It must be regarded as completely unexpected that the mixtures according to the invention have such excellent rheological and optical properties since mixtures of fully aromatic polycarbonates normally either give rise to cloudy moulded parts or are subject to discolouration or do not have the necessary optical properties.

The Examples given below again illustrate in some detail the mixtures according to the invention and the technological advantages of the moulded parts produced from them.

EXAMPLES

The following starting substances were synthesized for the preparation of the mixtures according to the invention:

SUBSTANCE 1

Polycarbonate based on the bisphenol corresponding to formula (I) (2,2'-bis-(3-phenyl-4-hydroxyphenyl)-propane)

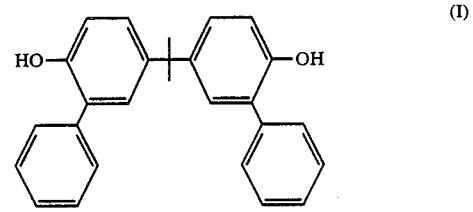

SUBSTANCE 2

Polycarbonate based on the bisphenol corresponding to formula (II) (2,2'-bis-(4-hydroxyphenyl)1-phenylethane)

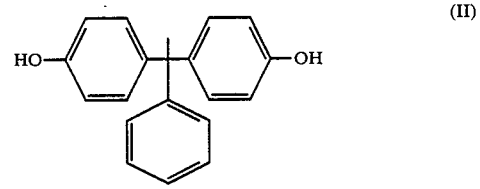

SUBSTANCE 3

Polycarbonate based on the bisphenol corresponding to formula (III) (bisphenol-A)

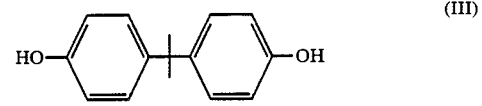

The homopolycarbonates were prepared in known manner by the phase interface process described by H. Schnell in "Chemistry and Physics of Polycarbonates", Polymer Review, Vol. 9, pages 13 et seq, Interscience Publishers 1964, The physical/analytical values shown in Table I are obtained. Mw is the weight average molecular weight determined in THF (units: g/mol): Tg is the glass temperature (in Celsius) determined by differential calorimetry (DSC) at a heating rate of 20 K/min: and C is the optical constant (unit: $10^{**}(-9)^{*}m^2/\text{Newton}$) determined by the method described by Janeschitz-Kriegl in Polymer Melt Rheology and Flow Birefringence, Springer-Verlag 1983. The relative viscosity ($\eta_{rel}$) was determined at a polymer concentration of 5 g/l of methylene chloride by comparison with that of methylene chloride at T=25°C. Table I also summarizes, in the last column, the disperse solubility of the three polycarbonates (determined in units of $J/\text{ccm}^{\frac{1}{2}}$).

TABLE 1

Characterisation of substances 1 to 3

| Substance No. | Bisphenol-A content in mol % | Mw | Tg | C | Eta-rel | Solubility |
|---|---|---|---|---|---|---|
| 1 | 0 | 37,700 | 139 | 1.2 | 1.24 | 19.3 |
| 2 | 0 | 31,000 | 185 | 1.3 | 1.21 | 18.7 |
| 3 | 100 | 28.500 | 146 | 3.2 | 1.28 | 17.5 |

COMPARISON EXAMPLE

This example shows that the technological advantages are not obtained by mixing a polycarbonate which has a high bisphenol-A content with a polycarbonate having a disperse solubility of from 18 to 35 $(J/\text{ccm})^{\frac{1}{2}}$.

2 g of Substance 1 were intimately mixed with 8 g of Substance 3 in methylene chloride and the solution was concentrated by evaporation. This solution was then used to cast a film 0.15 mm in thickness. This film was tempered for several hours under a vacuum at 80°C. while the methylene chloride evaporating was continuously removed by suction. The film obtained was cloudy. The constant C was measured on the mixture.
Result: $3.0^{*} 10^{**}(-9)$ m$^2$/Newton.

EXAMPLE

This Example illustrates the technical advantage obtained by preparing halogen-free fully aromatic binary polycarbonate mixtures which have a high disperse solubility and in which none of the components has a bisphenol-A content of more than 70 mol-% and both components have each a relative solution viscosity above 1.16.

2 g of Substance 1 were mixed in solution with 18 g of Substance 2 in methylene chloride and a film 0.1 mm in thickness was drawn from the solution after concentration.

After 3 minutes' tempering at 185°C., the film was cooled to room temperature. No cloudiness could be detected. The DSC measurement indicated a monophasic system having a glass temperature of 183°C. The optical constant C was determined on the material of the tempered film which was substantially free from solvent after a vacuum treatment at about 80°C. and a storage time of 4 hours. When samples were prepared for the rheo-optical measurement, care was taken to ensure that the temperature during preparation of the samples at no point exceeded 278°C. The value obtained for C is $0.9^{*} 10^{**}(-9)$ m$^2$/Newton.

We claim:

1. A thermoplastic molding composition comprising a mixture of
   (a) 5 to 95% by weight of a fully aromatic polycarbonate resin containing carbonate structural units derived from 2,2'-bis-(3-phenyl-4-hydroxyphenyl)-propane which resin is characterized in having a relative viscosity of at least 1.16, and a disperse solubility of about 18 to 35 $(J/\text{ccm})^{\frac{1}{2}}$, and
   (b) 5% to 95% by weight of a fully aromatic polycarbonate resin containing carbonate structural units derived from 2,2'-bis-(4-hydroxyphenyl)1-phenylethane which resin is characterized in having a relative viscosity of at least 1.16, and a disperse solubility of about 18 to 35 $(J/\text{ccm})^{\frac{1}{2}}$,
said viscosity being determined in methylene chloride at a concentration of 5 gram/liter at 25°C. said mixture having a molar content of bisphenol-A, based on the bisphenol content of each individual polycarbonate, of not more than 70 mol %.

2. The composition of claim 1 characterised in that the disperse solubility of each of the components of the mixture is from 18 to 26 $(J/\text{ccm})^{\frac{1}{2}}$.

3. The composition of claim 1 characterised in that the disperse solubility of the two components of the mixture is from 18.5 to 23 $(J/\text{ccm})^{\frac{1}{2}}$.

4. The composition of claim 1 characterised in that the disperse solubility of the two components of the mixture is from 18.5 to 22 $(J/\text{ccm})^{\frac{1}{2}}$.

5. The composition of claim 1 characterised in that the relative viscosity (determined in methylene chloride, c =5 g/l at 25°C.) of both components of the mixture is at least 1.2.

6. The composition of claim 1 characterised in that the molar content of bisphenol-A in each of the two components of the mixture, based in each case on the bisphenol content of the corresponding polycarbonate, is not greater than 30 mol-%.

7. The composition of claim 1 characterised in that at least one of the two components of the mixture contains at least 20 mol-% of bisphenols having aromatic groups in side chains.

8. A molded part of an optical data store comprising the composition of claim 1.

9. A molded part produced from the composition of claim 1.

* * * * *